United States Patent
Sasikumar (10) Patent No.: US 12,314,279 B2
(45) Date of Patent: May 27, 2025

(54) SYSTEMS AND METHODS FOR ASSET MAP INTERFACE FOR INFORMATION TECHNOLOGY INFRASTRUCTURE

(71) Applicant: Fidelity Information Services, LLC, Jacksonville, FL (US)

(72) Inventor: Aravind Sasikumar, Bengaluru (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 18/053,804

(22) Filed: Nov. 9, 2022

(65) Prior Publication Data

US 2024/0086415 A1   Mar. 14, 2024

(30) Foreign Application Priority Data

Sep. 8, 2022  (IN) .............................. 202211051334

(51) Int. Cl.
  *G06F 16/248*  (2019.01)
  *G06F 16/245*  (2019.01)
  *G06F 16/25*  (2019.01)
(52) U.S. Cl.
  CPC .......... *G06F 16/248* (2019.01); *G06F 16/245* (2019.01); *G06F 16/258* (2019.01)
(58) Field of Classification Search
  CPC ..... G06F 16/248; G06F 16/245; G06F 16/258
  See application file for complete search history.

(56) References Cited

U.S. PATENT DOCUMENTS

| | | | | |
|---|---|---|---|---|
| 9,665,433 B2* | 5/2017 | Grewal | ................ | G06Q 10/087 726/28 |
| 2005/0213511 A1* | 9/2005 | Reece | ................... | H04W 24/00 370/252 |
| 2011/0246337 A1* | 10/2011 | Wisman | ............... | G06Q 10/087 705/28 |
| 2012/0131683 A1* | 5/2012 | Nassar | .................. | G06F 21/604 726/28 |
| 2012/0221555 A1 | 8/2012 | Byrne et al. | | |
| 2018/0270736 A1* | 9/2018 | Meredith | ................. | H04W 4/80 |
| 2020/0201888 A1* | 6/2020 | Barday | .................. | G06Q 10/06 707/999.003 |
| 2020/0274714 A1* | 8/2020 | Suson | ................... | H04L 9/3239 726/28 |
| 2021/0029108 A1 | 1/2021 | Obando Chacon et al. | | |
| 2022/0198565 A1 | 6/2022 | Krishnaswamy et al. | | |
| 2022/0318308 A1* | 10/2022 | Dean | .................. | G05B 19/4063 726/28 |

OTHER PUBLICATIONS

International Search Report issued in International Application No. PCT/US2023/072617 dated Nov. 8, 2023 (11 pages).

\* cited by examiner

*Primary Examiner* — Yuk Ting Choi
(74) *Attorney, Agent, or Firm* — Bookoff McAndrews, PLLC (57) ABSTRACT

A method comprising performing, by at least one processor, operations including: sending a query including an identifier for an asset; receiving a data structure for the asset, wherein the data structure includes a determined relationship between the asset and other hardware and software assets; rendering the data structure into a format for display; and displaying the rendered data structure.

18 Claims, 8 Drawing Sheets

| DATA CENTER | ▲LEGEND | ♦DEVICE NAME | ♦SERIAL NUMBER | ♦MODEL | ♦MANAGE-MENT TOOL | ♦IP | ♦RACK LOCATION | ♦LOGIN THROUGH | ♦USER NAME | ♦VENDER | ♦COVTRACT END DATE | ♦EDIT |
|---|---|---|---|---|---|---|---|---|---|---|---|---|
| BDOC | U4POWERMAX | BMAP01 | MX01NH | TBD | FALSE | 192.168.0.1 | BF47 | NA | EID/ADM | HP | FALSE | EDIT |
| BDOC | FALSE | RANR | FALSE | TBD | FALSE | 192.168.0.2 | FALSE | FALSE | FALSE | FALSE | | EDIT |
| BDOC | COMPELLENT SC DSM PRIMARY | BRMAP01 | NA | TBD | FALSE | 192.168.0.3 | NA | BRMAP01 | EID/ADM | VMWARE | NA | EDIT |
| BDOC | COMPELLENT FS8600 DSM PRIMARY | BRMAP02 | NA | TBD | FALSE | 192.168.0.4 | NA | BRMAP02 | EID/ADM | VMWARE | NA | EDIT |

STORAGE INVENTORY
SHOW 15 ▼ ENTRIES

SEARCH RESULT FOR VM: LRKQ01   410

STORAGE 420

| VOLUME | POOL | | |
|---|---|---|---|
| STORAGE NAME | STORAGE POOL | VOLUME NAME | ALLO |
| LTNT1 | LOW PRIORITY (TIER 3) | LT-T-0004 | 8.00 |

421

COMPUTER 430

| DATASTORES | ESX | |
|---|---|---|
| DS NAME | NAA.ID | |
| LT-T-0004 | NAA.3230000R | C 8 |

431

VIRTUAL MACHINES 440

| INFO | DISKS | | |
|---|---|---|---|
| VM NAME | POWER STATE | GUEST STATE | HEARTBEAT |
| LRKQ01 | POWERED ON | RUNNING | GREEN |

441

DATABASES 450

| DB NAME | DISKS | |
|---|---|---|
| SERVER NAME | DB | NAME |
| LRKQ01 | alerts_hosted_tm_sit | alerts |
| LRKQ01 | alerts_hosted_tm_sit | alerts_log |
| LRKQ01 | alerts_OKTA_TM_SIT | alerts |
| LRKQ01 | alerts_OKTA_TM_SIT | alerts_log |

| COLOR CODING CALCULATION ||||||| |
|---|---|---|---|---|---|---|---|
| ASSET STATUS |||| TICKETING ||| RESULT |
| SINGLE POINT || REDUNDANT || TYPES ||| |
| ENTITY1 | ENTITY2 | ENTITY3 | ENTITY4 | INCIDENT | CHANGE | PROBLEM | FINAL COLOR |
| GREEN | GREEN | YELLOW | YELLOW | YELLOW | ORANGE | GREEN | ORANGE |
| RED | GREEN | GREEN | GREEN | GREEN | GREEN | GREEN | RED |
| GREEN | GREEN | YELLOW | YELLOW | GREEN | GREEN | GREEN | ORANGE |
| GREEN | GREEN | YELLOW | YELLOW | ORANGE | GREEN | ORANGE | RED |

| DATE | TIME | MASTER TICKET | RELATED TICKETS | ASSET | SUPPORT GROUP | SUPPORT MEMBER |
|---|---|---|---|---|---|---|
| 10/5/2021 | 8:00:00 AM | INCIDENT001 | INCIDENT001 | SAN1 | STORAGE | STORAGEMEMBER1 |
| 10/5/2021 | 8:05:00 AM | INCIDENT001 | INCIDENT001 | SAN1 | STORAGE | STORAGEMEMBER2 |
| 10/5/2021 | 8:05:00 AM | INCIDENT001 | INCIDENT002 | SERVER1 | COMPUTER | COMPUTERMEMBER1 |
| 10/5/2021 | 8:05:00 AM | INCIDENT001 | INCIDENT002 | SERVER1 | COMPUTER | COMPUTERMEMBER2 |
| 10/5/2021 | 8:05:00 AM | INCIDENT001 | INCIDENT003 | DB1 | DB | DB MEMBER1 |
| 10/5/2021 | 9:15:00 AM | INCIDENT001 | INCIDENT003 | DB1 | DB | DB MEMBER1 |
| 10/5/2021 | 9:25:00 AM | INCIDENT001 | INCIDENT003 | DB1 | DB | DB MEMBER1 |
| 10/5/2021 | 9:25:00 AM | INCIDENT001 | INCIDENT002 | SERVER1 | COMPUTER | COMPUTERMEMBER1 |
| 10/5/2021 | 9:25:00 AM | INCIDENT001 | INCIDENT002 | SERVER1 | COMPUTER | COMPUTERMEMBER2 |
| 10/5/2021 | 9:35:00 AM | INCIDENT001 | INCIDENT001 | SAN1 | STORAGE | STORAGEMEMBER2 |
| 10/5/2021 | 9:45:00 AM | INCIDENT001 | CHANGETASK001 | SAN1 | STORAGE | STORAGEMEMBER3 |
| 10/5/2021 | 9:45:00 AM | INCIDENT001 | CHANGETASK002 | SERVER1 | COMPUTER | COMPUTERMEMBER2 |
| 10/5/2021 | 9:55:00 AM | INCIDENT001 | CHANGETASK003 | SERVER1 | COMPUTER | COMPUTERMEMBER2 |
| 10/5/2021 | 9:56:00 AM | INCIDENT001 | CHANGETASK004 | DB1 | DB | DB MEMBER 2 |
| 10/5/2021 | 9:57:00 AM | INCIDENT001 | CHANGETASK005 | DB1 | DB | DB MEMBER 2 |
| 10/5/2021 | 11:05:00 AM | INCIDENT001 | INCIDENT001 | SAN1 | STORAGE | STORAGEMEMBER2 |
| 10/5/2021 | 11:15:00 AM | INCIDENT001 | INCIDENT002 | SERVER1 | COMPUTER | STORAGEMEMBER3 |
| 10/5/2021 | 11:20:00 AM | INCIDENT001 | INCIDENT003 | DB1 | DB | DB MEMBER2 |

FIG. 8

SEARCH RESULT FOR THE VM: PDCBR04, VC: PDC01, UPDATED 221479123:59 AGO ANALYTICS

STORAGE

VOLUME POOL [TICKETS] HEAT SUPPORT

| TYPE | ID | PRIORITY | STATE | mttr | OPEN | CLOSED | ASSIGNED |
|---|---|---|---|---|---|---|---|
| INCIDENT | INC001 | 3 | RESOLVED | BREACHED | JULY 20 2022 8:00 | JULY 25 2022 9:00 | STORAGE RESOURCE 1 |
| INCIDENT | INC008 | 3 | RESOLVED | ONTIME | JULY 23 2022 23:00 | JULY 24 2022 01:30 | STORAGE RESOURCE 3 |
| INCIDENT | INC005 | 4 | RESOLVED | ONTIME | JULY 21 2022 8:00 | JULY 21 2022 9:00 | STORAGE RESOURCE 1 |

910

COMPUTER

DATASTORES ESX [TICKETS] HEAT SUPPORT

| TYPE | ID | PRIORITY | STATE | mttr | OPEN | CLOSED | ASSIGNED |
|---|---|---|---|---|---|---|---|
| INCIDENT | INC003 | 3 | RESOLVED | BREACHED | JULY 20 2022 8:00 | JULY 25 2022 9:00 | COMPUTER RESOURCE 1 |
| INCIDENT | INC004 | 3 | RESOLVED | ONTIME | JULY 23 2022 23:00 | JULY 24 2022 01:30 | COMPUTER RESOURCE 3 |
| INCIDENT | INC001 | 2 | ONGOING | ONTIME | JULY 21 2022 8:00 | JULY 21 2022 9:00 | COMPUTER RESOURCE 1 |

920

SEARCH RESULT FOR THE VM: PDCBR04, VC: PDC01, UPDATED 221359141:33 AGO ANALYTICS

STORAGE

VOLUME POOL TICKETS [HEAT] SUPPORT

| STATE OF CIs RETURNED FROM SEARCH | HARDWARES | PERFORMANCE AND CAPACITY |
|---|---|---|
| GREEN | GREEN | GREEN |

930

COMPUTER

DATASTORES ESX TICKETS [HEAT] SUPPORT

| STATE OF CIs RETURNED FROM SEARCH | CPU | MEMORY | STORAGE | HBA |
|---|---|---|---|---|
| GREEN | YELLOW | GREEN | GREEN | YELLOW |

SYSTEMS AND METHODS FOR ASSET MAP INTERFACE FOR INFORMATION TECHNOLOGY INFRASTRUCTURE

CROSS-REFERENCE TO RELATED APPLICATION(S)

This patent application claims the benefit of priority to Indian Patent Application No. 202211051334, filed on Sep. 8, 2022, the entirety of which is incorporated herein by reference.

TECHNICAL FIELD

Various embodiments of the present disclosure relate generally to an interface for an automated framework to correlate infrastructure components.

BACKGROUND

A networked information technology infrastructure may contain numerous assets. An asset may refer to a hardware product or component, or to a software program or configuration. Currently available products do not provide a centralized asset management and mapping tool for global infrastructure operations that provides health and readiness of assets, asset-to-asset relationships, asset issue tracking, and asset incident and configuration change history with a robust interface. Accordingly, management of the assets and operations continues to be difficult. Currently available products do not provide a look up table or reference chart to find an impact or "blast radius" of a configuration item when a problem with the asset occurs. As used herein, a "blast radius" may refer to a way of measuring a total impact of a potential problem with an asset. The present disclosure is directed to overcoming one or more of the aforementioned limitations of what is known to date.

SUMMARY OF THE DISCLOSURE

In some aspects, the techniques described herein relate to a method including: performing, by at least one processor, operations including: sending a query including an identifier for an asset; receiving a data structure for the asset, wherein the data structure includes a determined relationship between the asset and other hardware and software assets; rendering the data structure into a format for display; and displaying the rendered data structure.

In some aspects, the techniques described herein relate to a method, wherein the data structure is created based on a linking algorithm applied to standardized data copied from an answer file generated by the asset in response to instructions sent to the asset, wherein the standardized data copied from the answer file is validated based on logging events associated with the copying of the standardized data from the answer file.

In some aspects, the techniques described herein relate to a method, wherein the sending the query includes sending the query to an external application.

In some aspects, the techniques described herein relate to a method, wherein the asset includes one or more of a storage asset, a computer asset, an operating system asset, a database asset, or an application asset.

In some aspects, the techniques described herein relate to a method, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

In some aspects, the techniques described herein relate to a method, wherein the data from the answer file is validated by prompting members of an approval group to validate a change to the data.

In some aspects, the techniques described herein relate to a method, wherein the displaying the rendered data structure includes associating a display color with the asset based on information in a ticketing tool.

In some aspects, the techniques described herein relate to a method, wherein the answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

In some aspects, the techniques described herein relate to a method, wherein the displaying the rendered data structure includes determining a support member for the asset, and displaying the determined support member.

In some aspects, the techniques described herein relate to a method, wherein the sending the query includes sending the query via a Uniform Resource Locator; and wherein the receiving the data structure includes receiving the data structure from an external application via JavaScript Object Notation.

In some aspects, the techniques described herein relate to a system including: a memory to store instructions; and at least one processor to execute the stored instructions to perform a method including: sending a query including an identifier for an asset; receiving a data structure for the asset, wherein the data structure includes a determined relationship between the asset and other hardware and software assets; rendering the data structure into a format for display; and displaying the rendered data structure.

In some aspects, the techniques described herein relate to a system, wherein the data structure is created based on a linking algorithm applied to standardized data copied from an answer file generated by the asset in response to instructions sent to the asset, wherein the standardized data copied from the answer file is validated based on logging events associated with the copying of the standardized data from the answer file.

In some aspects, the techniques described herein relate to a system, wherein the sending the query includes sending the query to an external application.

In some aspects, the techniques described herein relate to a system, wherein the asset includes one or more of a storage asset, a computer asset, an operating system asset, a database asset, or an application asset.

In some aspects, the techniques described herein relate to a system, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

In some aspects, the techniques described herein relate to a system, wherein the data from the answer file is validated by prompting members of an approval group to validate a change to the data.

In some aspects, the techniques described herein relate to a system, wherein the displaying the rendered data structure includes associating a display color with the asset based on information in a ticketing tool.

In some aspects, the techniques described herein relate to a system, wherein the answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

In some aspects, the techniques described herein relate to a system, wherein the displaying the rendered data structure includes determining a support member for the asset, and displaying the determined support member.

In some aspects, the techniques described herein relate to a non-transitory computer readable medium storing instructions that, when executed by at least one processor, cause the at least one processor to perform a method including: sending a query including an identifier for an asset; receiving a data structure for the asset, wherein the data structure includes a determined relationship between the asset and other hardware and software assets; rendering the data structure into a format for display; and displaying the rendered data structure.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 depicts an example table for a user interface, according to one or more embodiments.

FIG. 8 depicts another example table for a user interface, according to one or more embodiments.

DETAILED DESCRIPTION OF EMBODIMENTS

The following embodiments describe an interface for an automated framework to correlate infrastructure components, and, more particularly, to systems and methods for an interface for mapping a relationship between hardware and software assets in a networked information technology infrastructure.

A networked information technology infrastructure may contain numerous assets. An asset may refer to a hardware product or component, or to a software program or configuration. Currently available products do not provide a centralized asset management and mapping tool for global infrastructure operations that provides health and readiness of assets, asset-to-asset relationships, asset issue tracking, and asset incident and configuration change history with a robust interface. Accordingly, management of the assets and operations continues to be difficult. Currently available products do not provide a look up table or reference chart to find a blast radius of a configuration item when a problem with the asset occurs. Again, a blast radius may refer to a way of measuring a total impact of a potential problem with an asset.

Creating a functional configuration management database is a challenge for many companies, and organizations often invest heavily in an underlying infrastructure, professional services, and licenses. These projects are long term in nature and are rarely able to meet all the demands of an organization. Organizations may have complex tables that are difficult to maintain and to navigate.

Furthermore, when an application team identifies an issue, different infrastructure management teams may be used to investigate the issue. Some information from one team may be dependent on the findings of another team. This information dependency frequently leads to delays in addressing the issue. Also, an incorrect configuration item may be identified, which prohibits an efficient investigation, and often results in an overall delay in resolution of the issue.

In addition, information from different data sources, such as from a database or storage network, for example, may be fed into a centralized repository for artificial intelligence and/or machine learning algorithms, as the information from the different data sources may be raw. Therefore, processing data in the centralized repository may become complex for large amounts of information, and management of centralized repository may become unsustainable and expensive.

The present disclosure is directed to overcoming one or more of these above-referenced challenges.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description.

Various non-limiting embodiments of the present disclosure will now be described to provide an overall understanding of the principles of the structure, function, and use of the systems and methods disclosed herein.

One or more examples of these non-limiting embodiments are illustrated in the selected examples disclosed and described in detail with reference to the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The following embodiments describe an interface for an asset and/or inventory information storing framework that may store multi-vendor product information procured by a company.

The following embodiments may include an interface for interacting with information captured by data collection agents that capture information related to a child converged infrastructure generated by assets. Such information for a computer asset may include, for example, virtual servers, storage, network, CPU, and memory. Such information for a database asset may include, for example, a databases name, storage, and server of residence. Such information for a storage asset may include, for example, created volumes, storage pools, server mapping, and sharing.

Assets may be linked to other assets by various data. For example, a storage asset may be linked to a computer asset via a volume unique identifier. A computer asset may be linked to an operating system asset via a guest identifier. An operating system asset may be linked to a database asset via a guest name. A database asset may be linked to an application asset via a database name.

The following embodiments may include an interface for interacting with information provided by a correlation engine used to map and transform asset information to standard labels to import data from two different data sources. For example, computer and storage assets may be linked using a unique volume identification. Database assets may be structures with various database platforms across various network-attached storage assets. The assets may be linked in a child converged infrastructure and populate a configuration management database.

The following embodiments may include an interface for interacting with information provided by components that transform the configuration management database including the child converged infrastructure with linked assets into a searchable web application. The web application may provide the interface to display and search the child converged infrastructure with linked assets.

Figure 1:
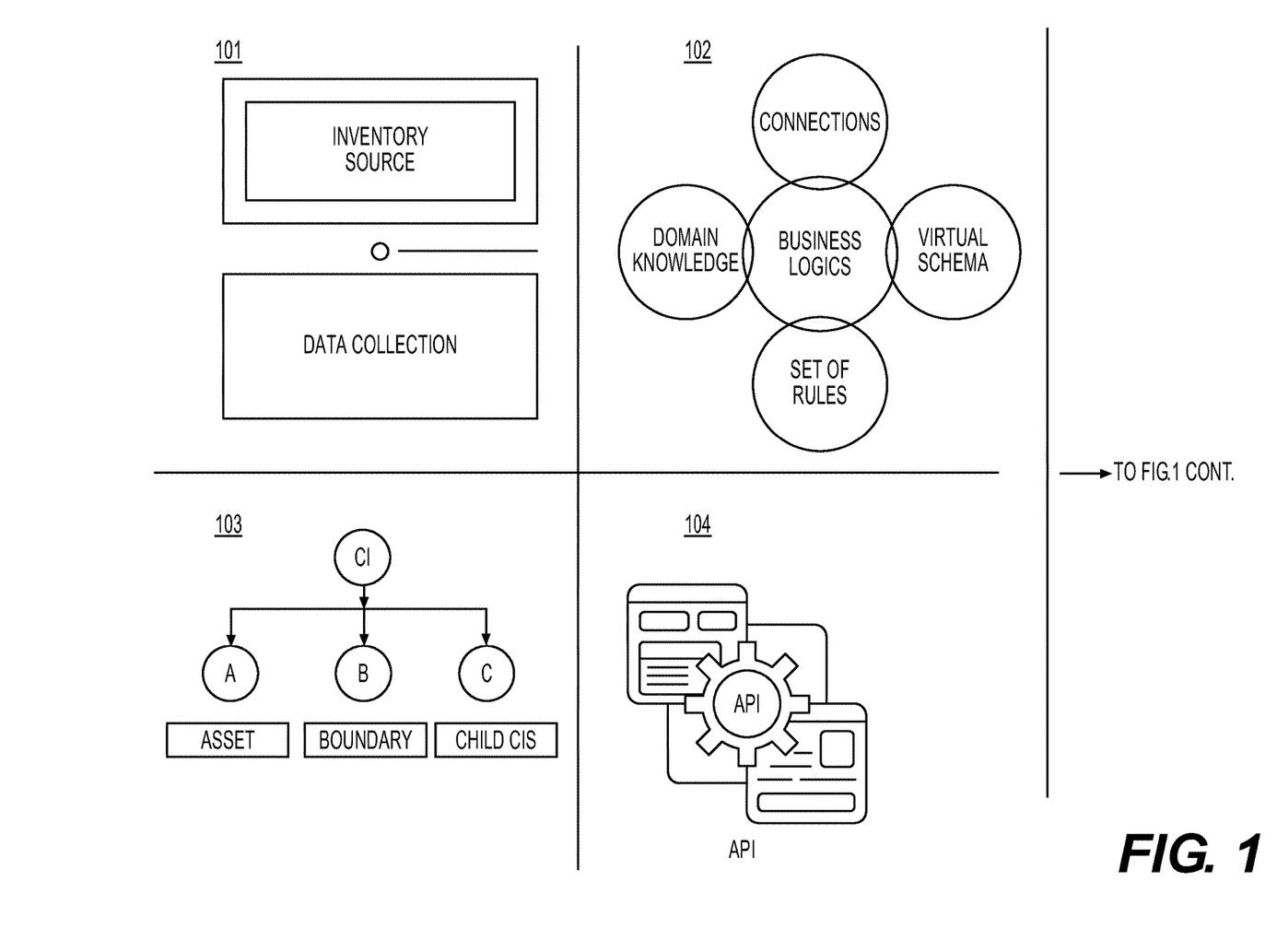
FIG. 1 depicts a block diagram of an example system for mapping relationships between assets in a networked information technology infrastructure, according to one or more embodiments.

FIG. 1 depicts a block diagram of an example system for mapping relationships between assets in a networked information technology infrastructure, according to one or more embodiments.

The system 100 for mapping relationships between assets in a networked information technology infrastructure may include various components, including inventory source and data collection 101, business logic 102, asset relationship links 103, and Application Programming Interfaces 104. Inventory source and data collection 101 may include hardware and software assets and raw data collected from the assets. Business logic 102 may include connections between assets, virtual schema, rules for mapping assets, and domain knowledge. Asset relationship links 103 may include assets, boundaries, and child converged infrastructure provided to link assets together. Application Programming Interfaces (API) 104 may include various tools to retrieve and display information related to the assets and relationships.

The system 100 for mapping relationships between assets in a networked information technology infrastructure may include various components. For example, system 100 may include database server 111, database server 112, and database server 113 connected to API gateway 141. System 100 may include computer 121, computer 122, and computer 123 connected to API gateway 142. System 100 may include storage 131, storage 132, and storage 133 connected to API gateway 143. Database server 111, database server 112, database server 113, computer 121, computer 122, computer 123, storage 131, storage 132, and storage 133 may be example assets of a networked information technology infrastructure.

API gateway 141, API gateway 142, and API gateway 143 may be connected to Data Collection Script (DCS) 151. DCS 151 may collect data from one or more of database server 111, database server 112, database server 113, computer 121, computer 122, computer 123, storage 131, storage 132, or storage 133 through API gateway 141, API gateway 142, or API gateway 143. DCS 151 may be connected to business logic 152. Business logic 152 may be connected to database 153. Database 153 may be connected to network node 154. Network node 154 may be connected to HTTP node 171. HTTP node 171 may be connected to database 153 and to business logic 172. Business logic 172 may be connected to configuration change server 173. Configuration change server 173 may be connected to API gateway 141, API gateway 142, and API gateway 143. User 161 may access system 100 through device 162 via authenticator 163 and web application 164. Web application 164 may be connected to network node 154.

Web application 164 may include features such as watchtowers, overwatch sentinels, auxiliaries, and mecha. The watchtowers may be technology-specific and provide tailored web applications for reporting. The overwatch sentinels may provide capabilities to email custom reports and custom alerts specific to an issue. The auxiliaries may support contracts, data center locations, downstream message routers, racks, access routes, standard operating procedures (SOPs), etc. The mecha may provide automated bots or programs for self-healing and Business as Usual (BAU) operations, such as provisioning.

System 100 may use an application programming interface (API) call, for example, to an asset to retrieve asset-format data and convert the retrieved asset-format data into standard-format data. The standard-format data may be displayed on a user interface, such as web application 164, providing an overview of a plurality of assets. Additionally, from the web application 164, a user 161 may change a configuration of an asset through configuration change server 173.

The instructions for the DCS 151 may be implemented in PowerShell and/or Python, for example. The instructions for the business logic 152 and 172 may be implemented in open source code including Papa Parse, C3.js, and/or jQuery, for example. The instructions for the web application 164 may be implemented using HTML, CSS, JavaScript, and/or NODE.js, for example. However, the above examples are merely provided for illustration, and the disclosure is not limited to the above implementations.

Business logic 152 may include features such as data visualization, analytics, bounty dashboards, risk boards, and Artificial Intelligence for Information Technology Operations (AIOPS), which may be implemented with PowerShell and NODE.js using data from Comma Separated Values (CSV) and MongoDB, for example.

DCS 151 may include features such as vendor developed and supported APIs, Software Development Kits (SDKs), and other toolkits. DCS 151 may further provide data collection, structuring, and post script capabilities. Additionally, DCS 151 may provide AIOPS based on storage management standards. DCS 151 may be deployed for any type of system, such as a server, an operating system, or a storage device, for example. DCS 151 may be a script or collection of scripts to log in to a system if necessary and collect one or more properties of the system. For example, DCS 151 may collect data related to system storage space utilization. DCS 151 may also include a log to track event errors, successes, and/or failures for code audits and enhancements.

Business logic 152 may provide business profiles for data enrichment. A script or collection of scripts may read the data from DCS 151, and convert the read data from DCS 151 to information using logic bound to a Line of Business (LOB), such as interacting with web application 164. Business logic 152 may use structured data saved to a database, or saved as a Comma Separated Values (CSV) file for the web application 164.

Web application 164 may provide information such as device capacity, hardware health, performance, bounty dashboards, and Service Level Agreements (SLA) meters in a readily viewable form. The web application 164 may provide a collection of tools and code to interpret data from the business logic 152 in tabular and/or graphical form.

DCS 151 may be considered to be a data harvester from assets. Scripts of any programming language configured to implement certain application programming interface (API) operations, such as "get" and "put" operations, may be placed in a server. Data collection may be scheduled as needed depending on the urgency of the data. Because the data is inter-related, the data may be used for many different types of analyses. The system is platform independent so that components may be independently developed and implemented, as long as the output of the components follow a common architecture.

Structuring the data may include collecting data from assets using, e.g., API calls, and formatting the collected data to a tabular format with standard header names. The output may be created as a file and saved in a database 153. The system may include additional automation to validate the collected data prior to usage. Business specific data transformation may be applied, and the collected data may be enriched. The information may be visualized using a web application 164. The implementation results may be captured for audits and other business workflows.

DCS 151 may use a get operation to collect data from multiple assets. The collected data may be centralized, validated, and saved to a database 153, and converted to a webpage for display in web application 164. DCS 151 may also use a put operation to generate an answer file based on a workflow addition in a ticketing tool, where data is converted as needed, and saved to a file to change a configuration of an asset using configuration change server 173. Additionally, the answer file may link the ticketing tool to the system 100, where parameters from the workflow addition and data collection may be separately validated for execution.

Data from each assets may include, for example, MasterClass: {type: String, Required: true, default: 'Storage'}, DC: {type: String, required: false, default: false}, StorageType: {type: String, required: false, default: false}, DeviceName: {type: String, required: false, default: false, unique:true}, NodeName: {type: String, required: false, default: false}, SerialNumber: {type: String, required: false, default: false}, IP: {type: String, required: false, default: false}, VIP: {type: String, required: false, default: false}, ENV: {type: String, required: false, default: false}, State: {type: String, required: false, default: false}, IsMaster: {type: String, required: false, default: false}, Manufacturer: {type: String, required: false, default: false}, Vendor: {type: String, required: false, default: false}, Model: {type: String, required: false, default: false}, ContractEndDate: {type: String, required: false, default: false}, ManagementTool: {type: String, required: false, default: false}, RackLocation: {type: String, required: false, default: false}, LoginThrough: {type: String, required: false, default: false}, UserName: {type: String, required: false, default: "NA"}, Legend: {type: String, required: false, default: false}, BU: {type: String, required: false, default: false}, DataManagerGroup: {type: String, required: false, default: false}, DataApprovalGroup: {type: String, required: false, default: false}, SupportGroup: {type: String, required: false, default: false}, ChangeManagementGroup: {type: String, required: false, default: "Change Management-Global"}DCAddress: {type: String, required: false, default: false}, LastUpdated: {type: Date, required: false, default: Date.now}, LastUpdatedBy: {type: String, required: false, default: "System"}, IsAnAsset: {type:String, required:false, default: "No"}, and AssetTag: {type: String, required:false, default: false}.

Figure 2:
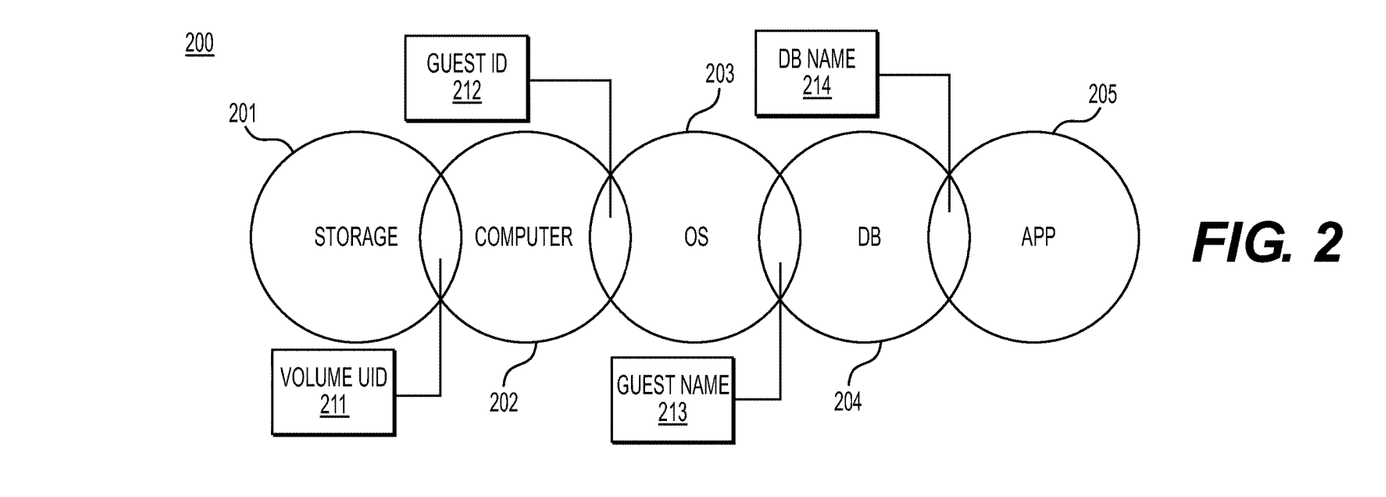
FIG. 2 depicts an example asset linking diagram, according to one or more embodiments.

FIG. 2 depicts an example asset linking diagram 200, according to one or more embodiments.

Assets may be linked to other assets by various data. For example, a storage asset 201 may be linked to a computer asset 202 via a volume unique identifier 211. A computer asset 202 may be linked to an operating system asset 203 via a guest identifier 212. An operating system asset 203 may be linked to a database asset 204 via a guest name 213. A database asset 204 may be linked to an application asset 205 via a database name 214.

Linking assets may be performed by a correlation engine. In the correlation engine, data from different sources may be tagged appropriately, using primary attribute "Device Name", for example, which may exist in inventory data, child converged infrastructure, and boundary converged infrastructure. Assets may be linked using a primary relation, application binding, ticketing records, network records, or backup records, for example. A primary relation may use the boundary data to create a correlation between assets. In application binding, the application information is captured using hash tags or comment sections of the child converged infrastructure. For ticketing records, an incident change or problem record of a device (virtual or physical) may be related using the converged infrastructure item name. Network records may use the network property of the devices (attributes related to network) to relate all upstream and downstream connections to an asset. Backup records may be used for computer assets.

Figure 3:
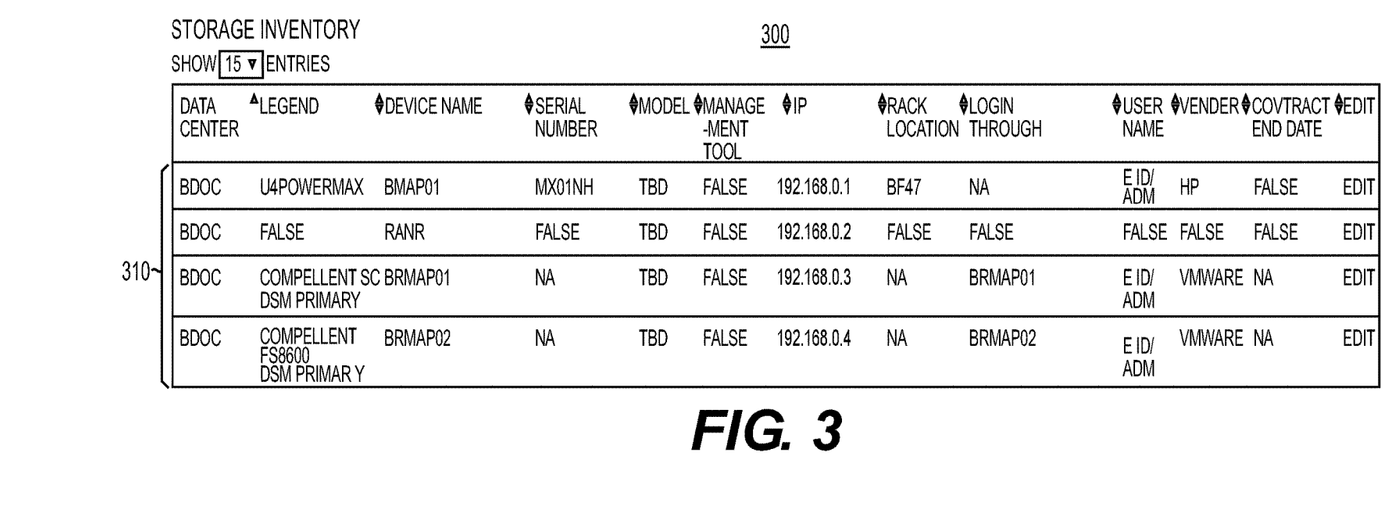
FIG. 3 depicts an example storage inventory user interface, according to one or more embodiments.

FIG. 3 depicts an example storage inventory user interface, according to one or more embodiments.

Storage inventory user interface 300 may include data 310. Data 310 may include information retrieved from various assets in a networked information technology infrastructure. Data 310 may include, for example, a device name, serial number, IP address, physical location, network location, user name, or vendor. Data 310 may be editable in the storage inventory user interface 300.

Figure 4:
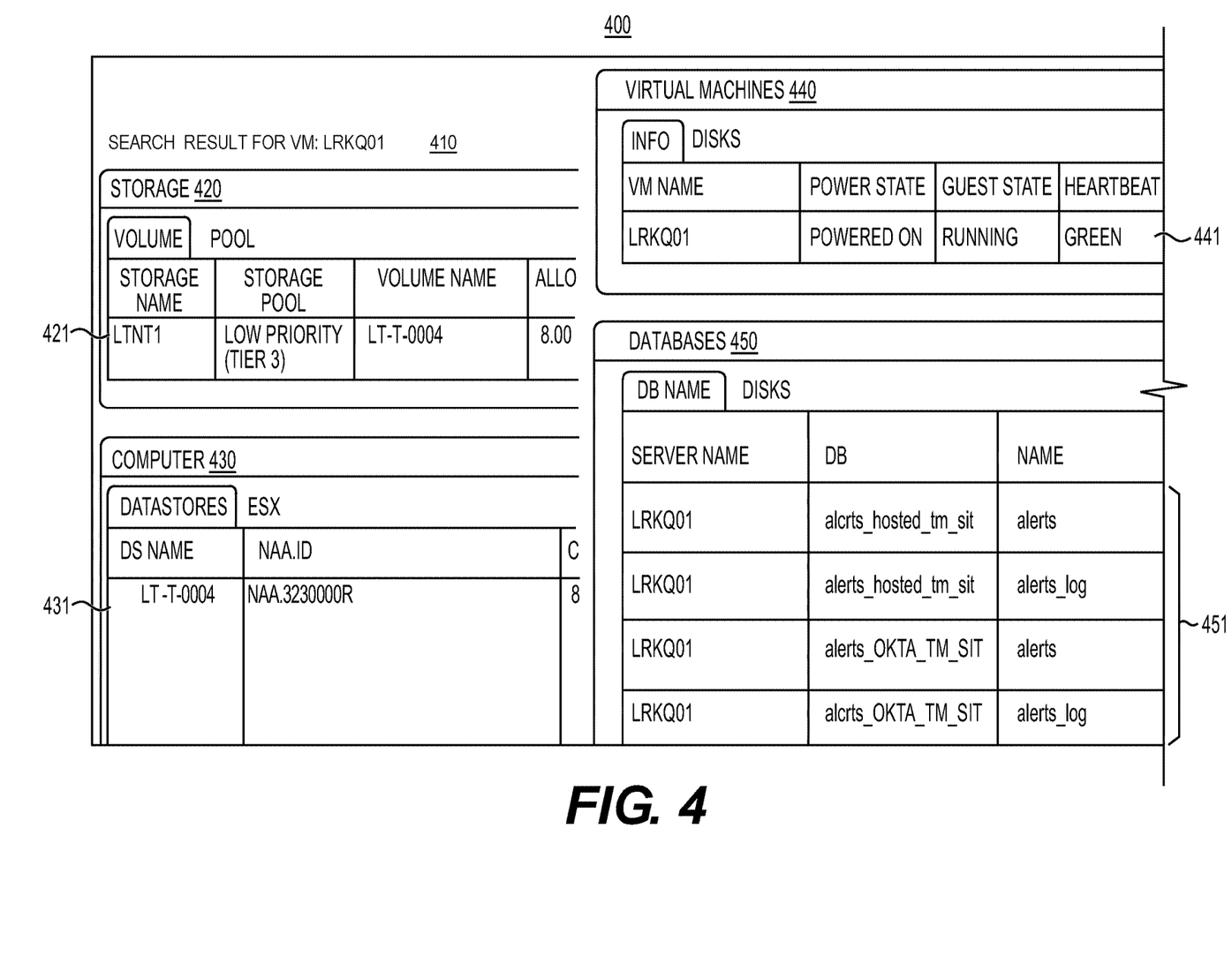
FIG. 4 depicts another example user interface, according to one or more embodiments.

FIG. 4 depicts an example user interface, according to one or more embodiments.

User interface 400 may include mapping data for an asset. Mapping data may include information linking various assets in a networked information technology infrastructure.

For example, as illustrated in FIG. 4, a virtual machine 410 may be linked to storage assets 420, computer assets 430, virtual machine assets 440, and database assets 450. Storage assets 420 may include information related to volume 421, computer assets 430 may include information related to differentiated services 431, virtual machine assets 440 may include information related to virtual machine 441, and database assets 450 may include information related to databases 451.

Figure 5:
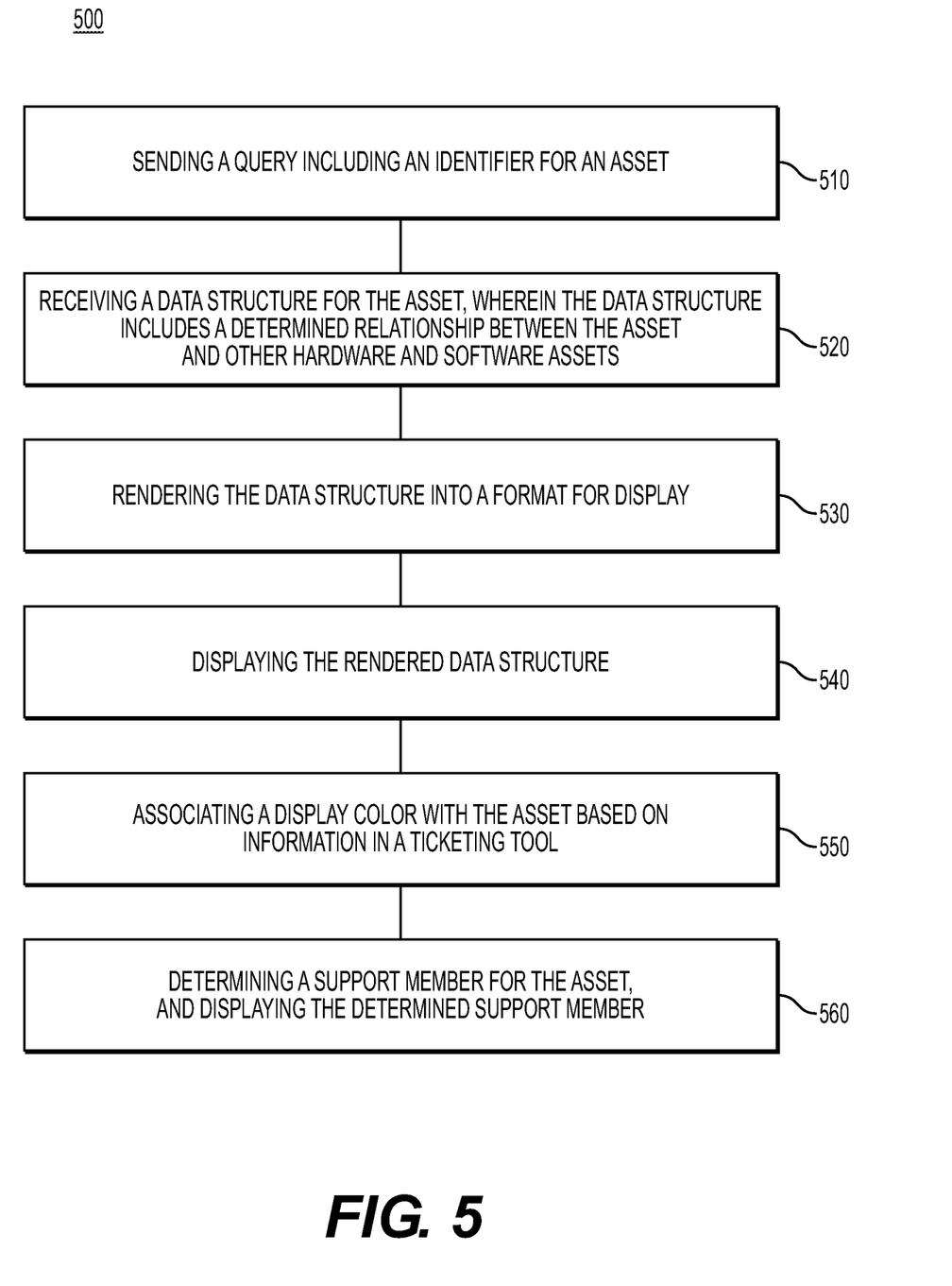
FIG. 5 depicts a flow diagram illustrating an example process logic flow for providing an interface for mapping relationships between assets in a networked information technology infrastructure, according to one or more embodiments.

FIG. 5 depicts a block diagram illustrating an example process logic flow for providing an interface for mapping relationships between assets in a networked information technology infrastructure, according to one or more embodiments.

System 100 may include web application 164, storage inventory user interface 300, and/or user interface 400, for example.

Method 500 may include performing, by at least one processor 602 of system 100, various operations. The various operations may include sending a query including an identifier for an asset (operation 510). The various operations may include receiving a data structure for the asset, wherein the data structure includes a determined relationship between the asset and other hardware and software assets (operation 520). The various operations may include rendering the data structure into a format for display (operation 530). The various operations may include displaying the rendered data structure (operation 540). The various operations may include associating a display color with the asset based on information in a ticketing tool (operation 550). The various operations may include determining a support member for the asset, and displaying the determined support member (operation 560).

The data structure may be created based on a linking algorithm applied to standardized data copied from an answer file generated by the asset in response to instructions sent to the asset, and the standardized data copied from the answer file may be validated based on logging events associated with the copying of the standardized data from the answer file. The query may be sent to an external application. The asset may include one or more of a storage asset 201, a computer asset 202, an operating system asset 203, a database asset 204, or an application asset 205. The determined relationship may include one or more of a storage asset 201 linked to a computer asset 202 via a volume unique identifier 211, a computer asset 202 linked to an operating system asset 203 via a guest identifier 212, an operating system asset 203 linked to a database asset 204 via a guest name 213, or a database asset 204 linked to an application asset 205 via a database name 214. Data from the answer file may be validated by prompting members of an approval group to validate a change to the data. The answer file may include one or more of volume properties of a storage asset 201, virtual machine information of a computer asset 202, virtual disk information of a computer asset 202, physical storage information of a computer asset 202, guest server information of a database asset 204, database size information of a database asset 204, database name information of a database asset 204, or database disk association of a database asset 204. The query may be sent via a Uniform Resource Locator, and the data structure may be received from an external application via JavaScript Object Notation.

DCS 151 may use a script to log into an asset and generate an asset answer file as a volatile or non-volatile instance. DCS 151 may use an API to collect data from the generated answer file to volatile or non-volatile memory. DCS 151 may track collection events (with error or success) and log the events to a ticketing tool (not shown) for audit. DCS 151 may validate the collected data using the logged events. Business logic 152 may read the validated data from volatile memory, may determine standard reporting data from the read asset data, and may save the standardized data in a formatted structure for the assets in database 153. Web application 164 may display saved data in a graphical user interface (e.g., Web UI) in response to user queries to the database 153.

Web application 164 may display the standard format data in a variety of group configurations. For example, the standard format data may be displayed as separate web interfaces for different geographical areas or networks.

In one or more embodiments, a user may input a requested configuration change for a vendor storage device into a ticketing tool. Configuration change server 173 may use an asset API to log into an asset using a user name and password. The configuration change server 173 may transform the requested configuration change from the ticketing tool into an asset specific format, and update the asset using the configuration change in the asset specific format. The configuration change server 173 may query the asset to determine whether the configuration was successfully applied, and log the configuration change. The configuration change server 173 may provide a message to the ticketing tool indicating the requested configuration change was successfully applied.

Assets have different ways of interpreting similar data, which may confuse system administrators and/or delay responses when handling different assets. By using data standardization, system administrators and others may more easily read the data and take appropriate actions. Data collection may be performed using API or Secure Shell Protocol (SSH), for example. Collected data may be formatted in such a way that the data representing an asset specific term is converted to an Industry standard form. LOB thresholds may be applied on the data for analytics, the information may be enriched and validated, and execution logs may be captured. The final data may be converted to CSV UTF-8 format, for example, and saved locally for general access by a web application 164. The data may be used for replication data and/or snapshot interpretations. The standardized data may be visualized into charts, where a violation of LOB rules may be highlighted for operational stability. The standardized data may be used during implementation for go/no-go scenarios to avoid issues related to assets.

Figure 6:
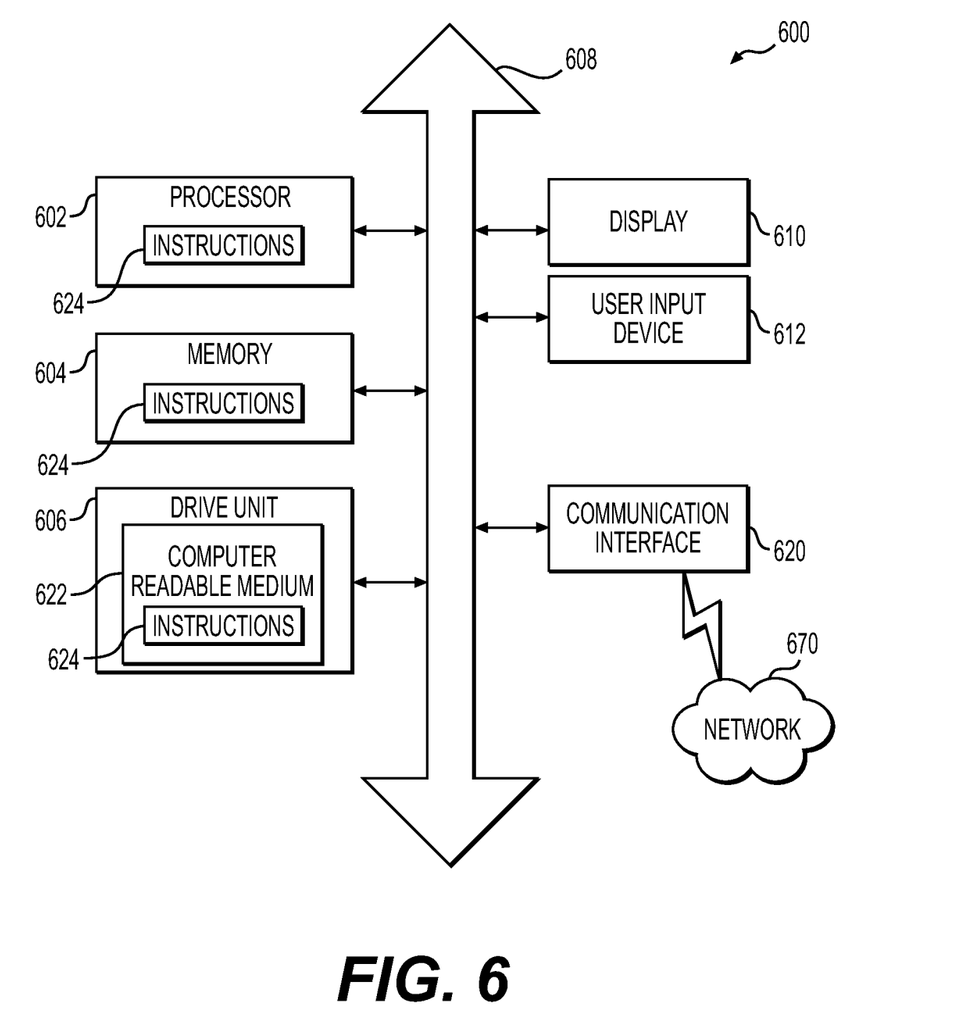
FIG. 6 illustrates an implementation of a general computer system that may execute techniques presented herein, according to one or more embodiments.

FIG. 6 illustrates an implementation of a general computer system that may execute techniques presented herein.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 6 illustrates an implementation of a computer system 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of computer system 600. The input device 612 may be a number pad, a keyboard, or a cursor control device, such as a mouse, or a joystick, touch screen display, remote control, or any other device operative to interact with the computer system 600.

The computer system 600 may also or alternatively include drive unit 606 implemented as a disk or optical drive. The drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 670 can communicate voice, video, audio, images, or any other data over the network 670. Further, the instructions 624 may be transmitted or received over the network 670 via a communication port or interface 620, and/or using a bus 608. The communication port or interface 620 may be a part of the processor 602 or may be a separate component. The communication port or interface 620 may be created in software or may be a physical connection in hardware. The communication port or interface 620 may be configured to connect with a network 670, external media, the display 610, or any other components in computer system 600, or combinations thereof. The connection with the network 670 may be a physical connection, such as a wired Ethernet connection or may be established wirelessly as discussed below. Likewise, the additional connections with other components of the computer system 600 may be physical connections or may be established wirelessly. The network 670 may alternatively be directly connected to a bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to a network 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

FIG. 7 depicts an example table 700 for a user interface, according to one or more embodiments. The temperature report may include colors such as red, orange, yellow, and green correlating with various severity levels.

As shown in FIG. 7, table 700 may be a look-up table with different combinations of inputs from an asset status and ticketing tool providing a different result for a final color for display of the asset. For example, example table 700 illustrates associated temperatures for various entities associated with an asset and for various tickets associated with the asset. The resulting final color in each row is based on a combination of all of the associated temperatures in that row.

User interface 400 may be integrated with the ticketing tool, and may provide a temperature report, or heat map. For example, user interface 400 may query the ticketing tool with mapping data to collect incidents, changes, and problems generated for an asset in a specified time period, such as the past seven days, for example, or for a minimum ticket count, such as ten tickets, for example.

The query may identify previous issues and determine the health of the asset. For the temperature report, the operational status of any one of many of a redundant logical link may highlight a search result in yellow. The operational status of any one of many of a redundant hardware link may highlight a search result in orange. For the temperature report, any of a single point of failure item status other than online may highlight a search result in red.

In the ticketing tool, incidents may be assigned a severity level such as P1, P2, and P3, for example, where P1 is a most severe incident. User interface 400 may assign various colors for the temperature report. For example, user interface 400 may highlight incidents with a severity level of P2 or above that were closed in the last 7 days in yellow. User interface 400 may highlight an ongoing problem with an incident severity level of P3 or below in yellow. User interface 400 may highlight an ongoing problem with an incident severity level of P2 or above in orange. User interface 400 may highlight an ongoing change ticket in orange. User interface 400 may highlight an ongoing incident with an incident severity level of P2 or above in red.

The result color for display may be based on a combination of other colors as shown in FIG. 7. Example table 700 may also use additional logic to determine a particular color for a result. For example, a disk asset may be coded as yellow with more than 75 associated incidents, as orange with more than 85 incidents, and as red with more than 90 incidents.

FIG. 8 depicts another example table 800 for a user interface, according to one or more embodiments.

As shown in FIG. 8, based on the type of problem incident and changes, user interface 400 may determine a support group, or primary team, for an asset, and may identify members who have worked on the issue. User interface 400 may determine a secondary team for an asset, which may be based on the count of the participation of the member for a ticket. User interface 400 may determine the support group (the people best fit for the ticket handling) based on the direct involvement of the member to a ticket and the count of the updates which are mentioned in the ticket.

If user interface 400 cannot determine the support group for a primary asset based on the direct involvement of the member to a ticket and the count of the updates which are mentioned in the ticket, user interface 400 may determine members of a support group who contributed the most for any other asset linked to the primary asset, such as with a preference filter by same model or manufacturer or device class (in descending order). User interface 400 may also filter the members based on the time zone to align the right member based on availability. User interface 400 may determine availability by understanding the pattern but ranking the support member based on the contributions and then ranking by time.

User interface 400 may store the determined support group and support member in table 800.

Figure 9:
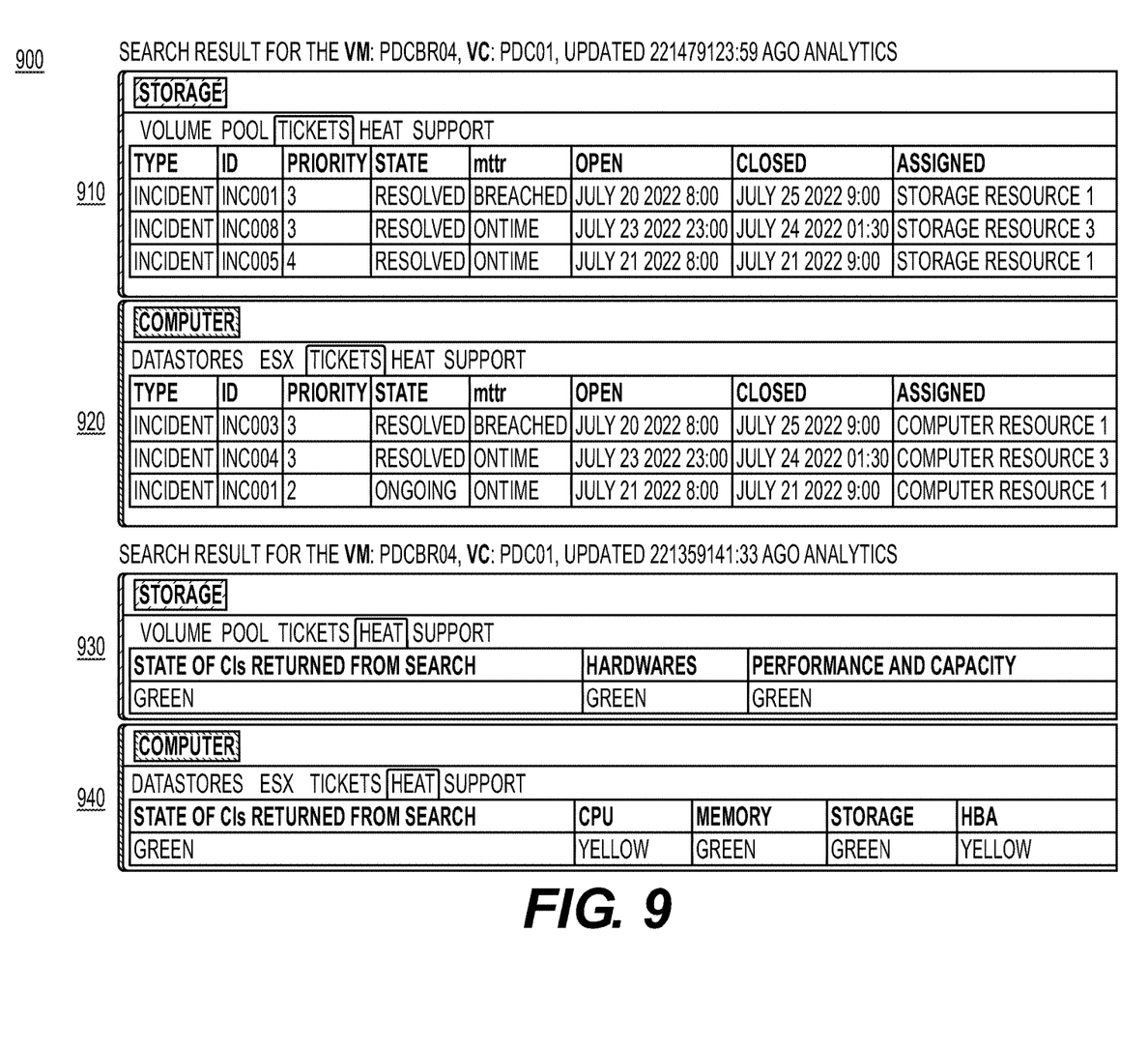
FIG. 9 depicts another example user interface, according to one or more embodiments.

FIG. 9 depicts another example user interface, according to one or more embodiments.

As shown in FIG. 9, user interface 900 may include information for an primary asset. This information may include ticket list 910 associated with a storage asset linked to the primary asset, ticket list 920 associated with a computer asset linked to the primary asset, heat map 930 associated with the storage asset linked to the primary asset, and heat map 940 associated with a computer asset linked to the primary asset. The information may be provided on different tabs in user interface 900 as shown in FIG. 9, but the disclosure is not limited thereto.

The techniques disclosed in the present disclosure result in technical improvements by providing a centralized asset management and mapping tool for global infrastructure operations that provides health and readiness of assets, asset-to-asset relationships, asset issue tracking, and asset incident and configuration change history. Accordingly, mapping of the assets and operations is improved. The techniques disclosed in the present disclosure provide a look up table or reference chart to find a blast radius of a configuration item when a problem with the asset occurs.

The techniques disclosed in the present disclosure creating a functional configuration management database so that organizations do not need to invest heavily in an underlying infrastructure, professional services, and licenses. The techniques disclosed in the present disclosure allow integrated infrastructure management teams to investigate an issue, which reduces delays in addressing the issue. The techniques disclosed in the present disclosure identify correct configuration items, which provides an efficient investigation, and reduces overall delays in resolution of the issue.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems may be made and used. A number of modifications, including substitutions of systems between or among examples and variations among combinations may be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc., may be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically may be grouped together to perform a function or group of related functions. Like reference numerals are generally intended to refer to the same or similar components. Components and modules may be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein may be applied to, or easily modified for use with, other types of equipment, may use other arrangements of computing systems such as client-server distributed systems, and may use other protocols, or operate at other layers in communication protocol stacks, than are described.

It is intended that the specification and examples be considered as exemplary only, with a true scope and spirit of the disclosure being indicated by the following claims.

What is claimed is:

1. A method comprising:
    performing, by at least one processor, operations including:
        generating standardized data using data extracted from an answer file of an asset of a network, wherein the answer file of the asset of a network was generated by the asset in response to instructions transmitted to the asset via the network, wherein the instructions transmitted to the asset are based on a workflow addition in a ticketing tool, wherein the workflow addition in the ticketing tool includes a request for a configuration change of the asset, and the request includes converting data and storing changed configured of an asset;
        generating a data structure associated with the asset using the standardized data, wherein the generating the data structure includes applying a linking algorithm to the standardized data of the answer file generated by the asset in response to the instructions transmitted to the asset, wherein the standardized data is copied from the answer file and is validated based on logging events associated with the copying of the standardized data from the answer file;
        transmitting a query to an external application, wherein the query includes an identifier for the asset;
        receiving the data structure, wherein the data structure includes a determined relationship between the asset and at least one other hardware or software asset of the network;
        rendering the data structure into a format for display; and
        transmitting, to a user interface, the rendered data structure.

2. The method of claim 1, wherein transmitting the query includes sending the query to an external application.

3. The method of claim 1, wherein the asset includes one or more of a storage asset, a computer asset, an operating system asset, a database asset, or an application asset.

4. The method of claim 1, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

5. The method of claim 1, wherein the standardized data from the answer file is validated by prompting members of an approval group to validate a change to the standardized data.

6. The method of claim 1, wherein transmitting the rendered data structure to the user interface includes associating a display color with the asset based on information in the ticketing tool.

7. The method of claim 1, wherein the answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

8. The method of claim 1, wherein the displaying the rendered data structure includes determining a support member for the asset, and displaying the determined support member.

9. The method of claim 1, wherein transmitting the query includes sending the query via a Uniform Resource Locator; and
    wherein receiving the data structure includes receiving the data structure from an external application via JavaScript Object Notation.

10. A system comprising:
    a memory to store instructions; and
    at least one processor to execute the stored instructions to perform a method including:
        generating standardized data using data extracted from an answer file of an asset of a network, wherein the answer file of the asset of a network was generated by the asset in response to instructions transmitted to the asset via the network, wherein the instructions transmitted to the asset are based on a workflow addition in a ticketing tool, wherein the workflow addition in the ticketing tool includes a request for a configuration change of the asset, and the request includes converting data and storing changed configured of an asset;
        generating a data structure associated with the asset using the standardized data, wherein the generating the data structure includes applying a linking algorithm to the standardized data of the answer file generated by the asset in response to the instructions transmitted to the asset, wherein the standardized data is copied from the answer file and is validated based on logging events associated with the copying of the standardized data from the answer file;
        transmitting a query to an external application, wherein the query includes an identifier for the asset;
        receiving the data structure, wherein the data structure includes a determined relationship between the asset and at least one other hardware or software asset of the network;
        rendering the data structure into a format for display; and
        transmitting, to a user interface, the rendered data structure.

11. The system of claim 10, wherein transmitting the query includes sending the query to an external application.

12. The system of claim 10, wherein the asset includes one or more of a storage asset, a computer asset, an operating system asset, a database asset, or an application asset.

13. The system of claim 10, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

14. The system of claim 10, wherein the standardized data from the answer file is validated by prompting members of an approval group to validate a change to the standardized data.

15. The system of claim 10, wherein transmitting the rendered data structure to the user interface includes associating a display color with the asset based on information in the ticketing tool.

16. The system of claim 10, wherein the answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

17. The system of claim 10, wherein the displaying the rendered data structure includes determining a support member for the asset, and displaying the determined support member.

18. A non-transitory computer readable medium storing instructions that, when executed by at least one processor, cause the at least one processor to perform a method comprising:
generating standardized data using data extracted from an answer file of an asset of a network, wherein the answer file of the asset of a network was generated by the asset in response to instructions transmitted to the asset via the network, wherein the instructions transmitted to the asset are based on a workflow addition in a ticketing tool, wherein the workflow addition in the ticketing tool includes a request for a configuration change of the asset, and the request includes converting data and storing changed configured of an asset;
generating a data structure associated with the asset using the standardized data, wherein the generating the data structure includes applying a linking algorithm to the standardized data of the answer file generated by the asset in response to the instructions transmitted to the asset, wherein the standardized data is copied from the answer file and is validated based on logging events associated with the copying of the standardized data from the answer file;
transmitting a query to an external application, wherein the query includes an identifier for the asset;
receiving the data structure, wherein the data structure includes a determined relationship between the asset and at least one other hardware or software asset of the network;
rendering the data structure into a format for display; and
transmitting, to a user interface, the rendered data structure.

* * * * *